United States Patent [19]
Shimamune et al.

[11] Patent Number: 5,451,292
[45] Date of Patent: Sep. 19, 1995

[54] METHOD OF MANUFACTURING LIQUID-CRYSTAL ELEMENTS

[75] Inventors: Masayuki Shimamune, Tokyo; Yasuyuki Watanabe, Chigasaki, both of Japan

[73] Assignee: Canon Kabushiki Kaisha, Tokyo, Japan

[21] Appl. No.: 964,949

[22] Filed: Oct. 22, 1992

[30] Foreign Application Priority Data

Oct. 30, 1991 [JP] Japan .................. 3-310131

[51] Int. Cl.6 ............... H01L 21/44; H01L 21/308
[52] U.S. Cl. ................... 216/23; 252/79.2; 437/181; 437/923
[58] Field of Search ........ 156/664, 655, 667, 650, 156/651, 652, 656; 437/181; 252/79.2, 79.3

[56] References Cited

U.S. PATENT DOCUMENTS

| | | | |
|---|---|---|---|
| 4,822,146 | 4/1989 | Yamanobe et al. | 350/348 |
| 4,838,656 | 6/1989 | Stoddard . | |
| 4,850,681 | 7/1989 | Yamanobe et al. | 350/348 |
| 5,071,230 | 12/1991 | Hatano et al. . | |
| 5,150,239 | 9/1992 | Watanabe et al. | 359/80 |
| 5,296,096 | 3/1994 | Enomoto et al. . | |
| 5,366,588 | 11/1994 | Scholten et al. . | |

OTHER PUBLICATIONS

Fuyama, Moriaki, et al. "Fabrication Technology of Electrode for Liquid Crystal Display Panel", Chem. Abstr. 112(20) 188864t (1990).

*Primary Examiner*—Olik Chaudhuri
*Assistant Examiner*—C. Everhart
*Attorney, Agent, or Firm*—Fitzpatrick, Cella, Harper & Scinto

[57] ABSTRACT

A method of manufacturing liquid-crystal elements having two substrates on the surface of which a electrode group formed of stripe-shaped transparent electrodes and a metallic wiring pattern, and a liquid-crystal layer sandwiched between the two substrates, the method including the step of: repairing residue defects of the lower layer first and next residue defects of the upper layer by using etching solutions for selectively etching the transparent electrode or the metallic wiring pattern when etching residue defects between the stripe patterns of the transparent electrode and the metallic wiring are repaired.

4 Claims, 5 Drawing Sheets

FIG. 6
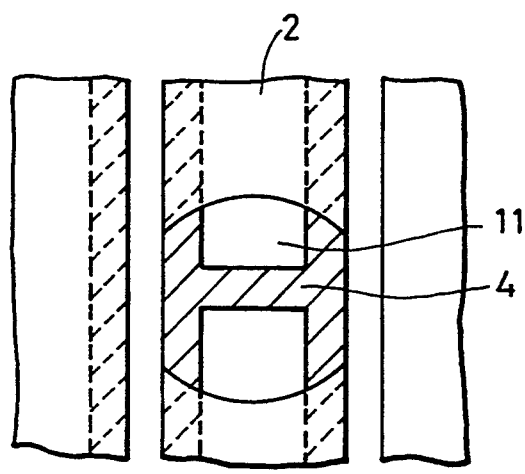
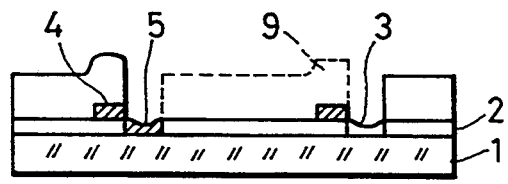
FIG. 7(d)
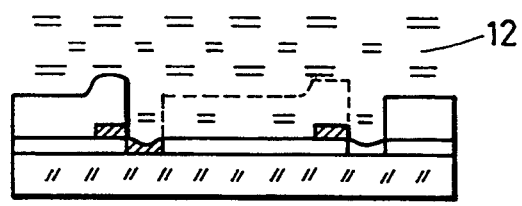
FIG. 7(e)
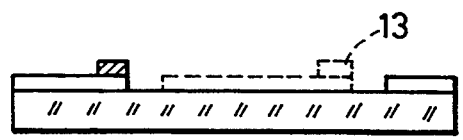
FIG. 7(f)

METHOD OF MANUFACTURING LIQUID-CRYSTAL ELEMENTS

BACKGROUND OF THE INVENTION

1. Field of the Invention

The present invention relates to a method of manufacturing liquid-crystal elements, in which etching residue defects between stripe patterns are repaired using solutions which can selectively etch transparent electrodes or metallic wiring.

2. Description of the Related Art

Flat type liquid-crystal display apparatus are formed of dot matrix type liquid-crystal display elements. Recently, attention has been directed to large screen and large capacity display apparatus, which require dot-forming electrodes with low resistance. In the apparatus, metallic wiring patterns employed as auxiliary electrodes are laminated on a transparent electrode of indium oxide (ITO) or the like. However, as the number of dot matrix pixels has increased, the space between electrodes has become narrow and technology for repairing defects (as well as methods for improving the yield during patterning) have become important. Hitherto, stripe-shaped transparent electrode residue defects and metallic wiring pattern residue defects have been repaired by etching solutions having no selectivity.

However, in the prior art described above and, as shown in FIG. 7, an etchant 12, which has no selectivity for the stripe pattern of the transparent electrode 2 and the metallic wiring 4, is commonly used as an etching solution. Since all the defective portions on the transparent electrode 3 and the metallic wiring pattern 5 are etched together when there is a defective portion 9 in a photoresist, a portion 13 (where the transparent electrode and the metallic wiring are disconnected) occur as shown in FIGS. 7(f) and 8, causing a problem such as a line defect.

To prevent the above-mentioned line defect, complex processing steps are performed, namely, first, a resist image for repairing transparent electrode residue defects is formed. After the transparent electrode residue defect is repaired, the resist image is peeled off. Then, a resist image is formed, and the metallic wiring pattern residue defect is repaired.

In an alternative commonly-used method of etching, the defective portion where etching residue remains between stripe patterns are cut out by a laser. However, matter scattered during cutting (or warping of the cut-out portion) may occurs, causing a gap defect of the panel or a short-circuit between upper and lower substrates.

SUMMARY OF THE INVENTION

It is an object of the present invention to provide a method of manufacturing liquid-crystal elements in which the above-mentioned problems are solved so that improved liquid-crystal elements, in particular, chiral smectic liquid-crystal elements may be obtained.

To this end, according to the present invention, there is provided a method of manufacturing liquid-crystal elements, in which an electrode residue defect of a lower layer is repaired first and next an electrode residue defect of an upper layer is repaired by using etching solutions for selectively etching the transparent electrode or the metallic wiring pattern when etching residue defects between stripe patterns of the transparent electrode and the metallic wiring.

As a result, even if there is a defective portion, (such as a pin hole) in the photoresist during a repair operation, the stripe pattern of electrodes is not disconnected. In addition, transparent electrode residue defects and metallic wiring residue defects can be repaired successively by one-time resist patterning.

Objectives and advantages in addition to those discussed above shall be apparent to those skilled in the art from the description of the preferred embodiments of the invention which follow. In the description, reference is made to the accompanying drawings, which form a part hereof, and which illustrate examples of the invention. Such examples, however, are not exhaustive of the various embodiments of the invention, and therefore reference is made to the appended claims for determining the scope of the invention.

BRIEF DESCRIPTION OF THE DRAWINGS

FIG. 6 is a plan view of the patterned shape of the transparent electrode and the metallic wiring after the residue defect is repaired as shown in FIG. 5(f);

FIGS. 7(d)–(f) is a view of steps illustrating drawbacks of the prior art; and

DETAILED DESCRIPTION OF THE PREFERRED EMBODIMENTS

Embodiments of the present invention will be explained below with reference to the accompanying drawings.

EXAMPLE 1

A photoresist was applied to a thickness of approximately 1 $\mu$m on a substrate on which a thin film of indium oxide (ITO), 1,500 Å thick, was formed by sputtering so that the ITO film serves as a transparent electrode 2. The substrate was located on a glass board 1. After the substrate was exposed using a pixel electrode pattern mask, it was developed and etched by a hydrogen iodide containing 30 vol % of ferric chloride, thus forming a pixel electrode pattern. Next, a molybdenum (Mo) thin film was formed into a thickness of 1,500 Å by sputtering on the substrate with a pixel electrode pattern so that the film serves as a metallic wiring 4.

Figure 1A:
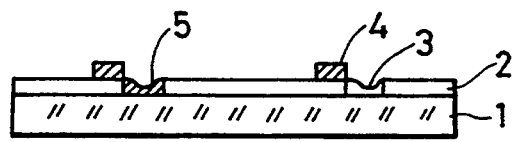
FIGS. 1(a)–(f) is a view of steps illustrating a method of repairing a residue defect between stripe patterns of a transparent electrode and metallic wiring.

A photoresist was applied again to a thickness of approximately 1 $\mu$m on the substrate on which the molybdenum thin film 4 had been formed, and was exposed using a metallic wiring pattern mask. Thereafter, the substrate was developed and etched using a phosphoric acid-nitric acid type etching solution for 60 seconds at room temperature. Thus, the metallic wiring pattern shown in FIG. 1(a) was formed.

Figure 1B:
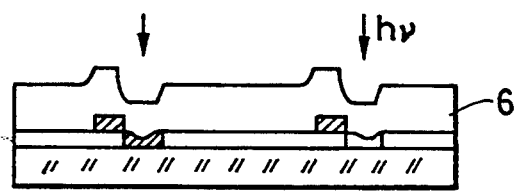
Figure 1C:
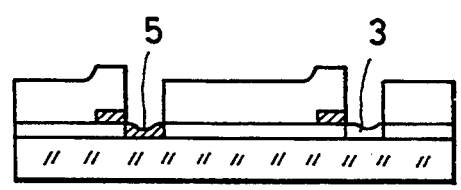

Next, as shown in FIG. 1(b), a photoresist 6 was applied once more to a thickness of approximately 1 μm on the substrate on which the metallic thin film had been formed. After the substrate was exposed using a pattern mask having an inter-electrode space equal to or narrower than that of the pixel electrode pattern mask, it was developed. Thus, a resist pattern was formed for repairing a transparent electrode residue defect 3 and a metallic wiring pattern residue defect 5, as shown in FIG. 1(c).

Figure 1D:
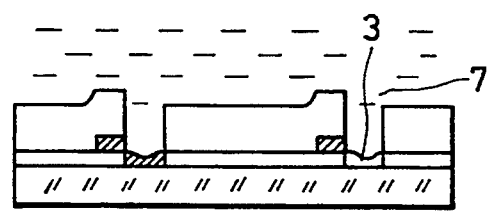
Figure 1E:
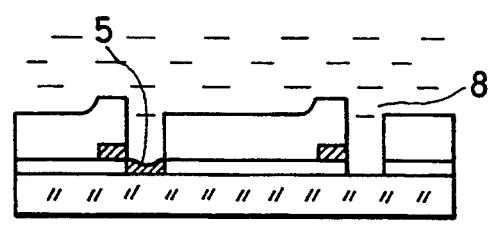

Thereafter, as shown in FIG. 1(d), the stripe pattern residue defect 3 of the ITO transparent electrode was repaired using hydrogen iodide (containing 30 vol % of ferric chloride) as a transparent electrode etchant 7. Then, as shown in FIG. 1(e), the etching residue defect 5 between the Mo metallic wiring patterns was repaired using, a phosphoric acid-nitric acid type etching solution as a metallic wiring etching solution 8.

Figure 3D:
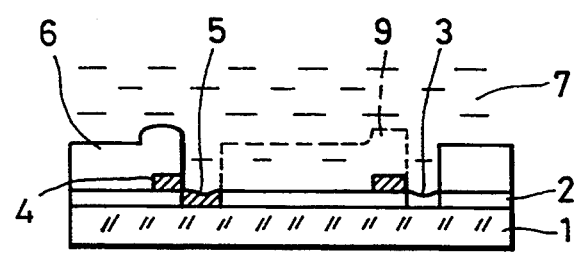
FIGS. 3(d)–(f) is a view of steps illustrating the effect of the operation of the present invention in a first embodiment thereof.
Figure 3E:
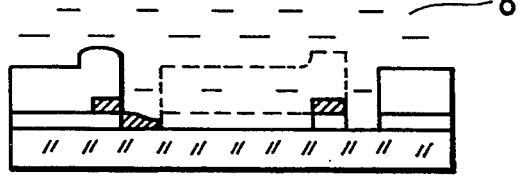
Figure 3F:
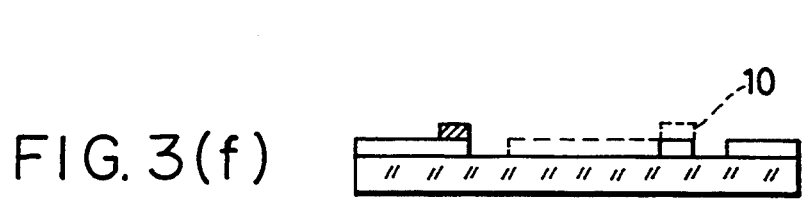
Figure 4:
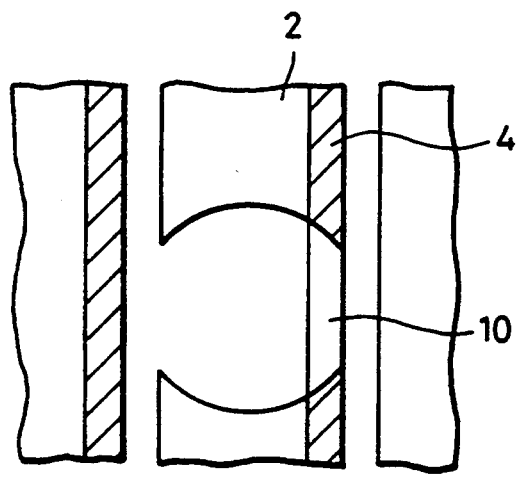
FIG. 4 is a plan view of the patterned shape of the transparent electrode and the metallic wiring after the residue defect is repaired as shown in FIG. 3(f)

According to the method of repairing electrode etching residue defects explained in this embodiment, as shown in FIG. 3, even if there is a photoresist defective portion 9 of a size which causes a disconnection in the stripe pattern of electrodes, such as a pin hole or flaw, when a repair operation is performed, the metallic wiring pattern 4 protects a portion of the transparent electrode 2. As a result, as shown in FIGS. 3(f) and 4, no disconnection occurs, preventing line defects during the operation time.

EXAMPLE 2

A molybdenum thin film (Mo), 1,500 Å thick, was formed on a glass board by sputtering so that the film serves as the metallic wiring pattern 4. Then, a ladder-shaped metallic wiring pattern shown in FIG. 6 was formed by an ordinary photo-lithographic process. A phosphoric acid-acetic acid-nitric acid type etching solution (volume ratio: 16:1:1) was used to etch the molybdenum thin film.

An ITO thin film, 1,500Å thick, was formed on the metallic wiring 4 pattern by sputtering so that the film serves as the transparent electrode 2. Then, a stripe pattern was formed by an ordinary photo-lithographic process. Hydrogen iodide was used to etch the ITO thin film.

Next, a photoresist pattern was formed on the substrate on which the patterns of the metallic wiring 4 and the transparent electrode 2 had been formed. Etching residue defects between stripe patterns of the Mo metallic wiring were repaired using a phosphoric acid-acetic acid-nitric acid type etching solution (volume ratio: 16:1:1). Then, etching residue defects between stripe patterns of the ITO transparent electrodes were repaired using hydrogen iodide.

Figure 5D:
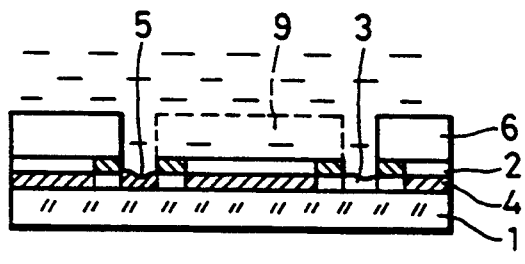
FIGS. 5(d)–(f) is a view of steps illustrating the effect of the operation of the present invention in a second embodiment thereof.
Figure 5E:
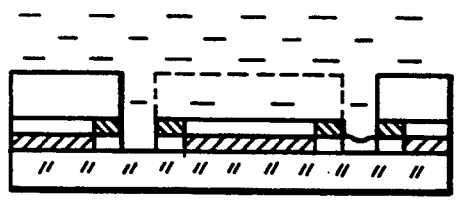
Figure 5F:
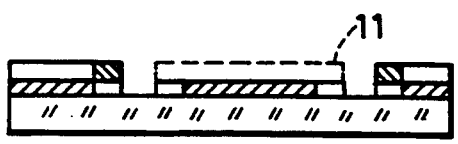
Figure 8:
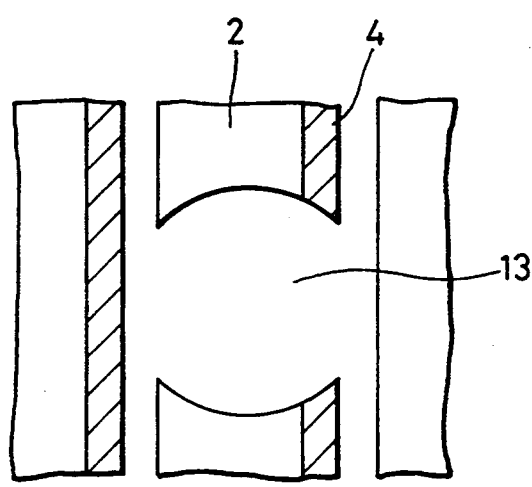
FIG. 8 is a plan view of the patterned shape of the transparent electrode and the metallic wiring after the residue defect is repaired as shown in FIG. 7(f).

According to the electrode arrangement and the method of repairing etching residue defects of electrodes explained in this embodiment, as shown in FIG. 5, the metallic wiring 4 is maintained as shown in FIG. 5(f) and 6 even if there is a photoresist defective portion 9 of a size which causes disconnection in a stripe pattern of electrodes, such as a pin hole, when a repair operation is performed. As a result, changes of wiring resistance can be prevented and a function of shielding leakage light from between pixels can be maintained compared with a case in which disconnection is prevented only by ITO as shown in FIG. 4.

As described above, an electrode residue defect of a lower layer is repaired first and next an electrode residue defect of an upper layer is repaired by using etching solutions for selectively etching residue defects between stripe patterns of the transparent electrode or the metallic wiring pattern. As a result, successive repairing is made possible by one-time patterning of a resist for repairing without causing disconnection of electrodes even if this resist has a flaw portion. Thus, the manufacturing steps can be simplified and productivity can be increased considerably.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded a broad interpretation, so as to encompass all such modifications and equivalent structures and functions.

What is claimed is:

1. A method of manufacturing liquid-crystal elements having two substrates, a surface of at least one of the substrates having an electrode group formed of stripe-shaped transparent electrodes and a metallic wiring pattern, and a liquid-crystal layer sandwiched between the two substrates, said method comprising the steps of:
   forming the transparent electrodes and the metallic wiring pattern on a substrate and then forming a resist coating a portion of the metallic wiring pattern;
   removing defects of a material of the transparent electrodes by using a first etching solution;
   removing defects of the metallic wiring pattern using a second etching solution different from said first etching solution; and
   removing said resist from the substrate.

2. A method of manufacturing liquid-crystal elements according to claim 1, wherein the transparent electrode is formed of indium oxide and a metallic wiring pattern is formed of molybdenum or a molybdenum alloy.

3. A method of manufacturing liquid-crystal elements according to claim 2, wherein said first etching solution is hydrogen iodide and said second etching solution is a phosphoric acid-acetate-nitric acid etching solution.

4. A method of manufacturing liquid-crystal elements according to claim 1, wherein the liquid-crystal elements are chiral smectic liquid-crystal elements.

* * * * *

UNITED STATES PATENT AND TRADEMARK OFFICE
CERTIFICATE OF CORRECTION

PATENT NO. : 5,451,292

DATED : September 19, 1995

INVENTOR(S) : MASAYUKI SHIMAMUNE ET AL.

It is certified that error appears in the above-indentified patent and that said Letters Patent is hereby corrected as shown below:

ON THE TITLE PAGE:

AT [57] ABSTRACT

Line 2, "a" should read --an--.
Line 5, "layer" should read --layer is--.

AT SHEET [4] FIGS. 7(d) - 7(f)

Insert --PRIOR ART--.

COLUMN 1

Line 17, "the" should read --these--.
Line 23, "Narrow" should read --narrower--.
Line 35, "together" should read --together,--.
Line 48, "portion" should read --portions--
Line 51, "occurs" should read --occur--.

COLUMN 2

Figure 1F:
Figure 2:
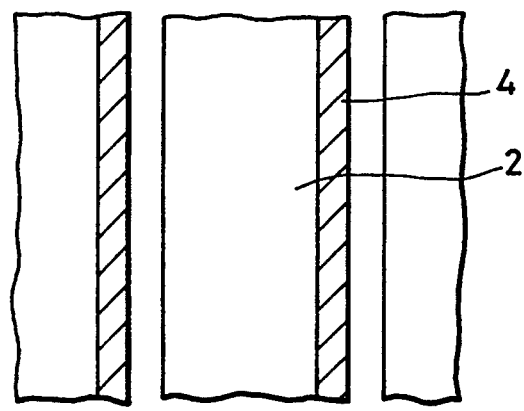
FIG. 2 is a plan view of the patterned shape of the transparent electrode and the metallic wiring after the residue defect is repaired as shown in FIG. 1(f).

Line 3, "portion," should read --portion--.
Line 26, "FIG. 1(f)." should read --FIG. 1(f);--.

UNITED STATES PATENT AND TRADEMARK OFFICE
CERTIFICATE OF CORRECTION

PATENT NO. : 5,451,292

DATED : September 19, 1995

INVENTOR(S) : MASAYUKI SHIMAMUNE ET AL.

It is certified that error appears in the above-indentified patent and that said Letters Patent is hereby corrected as shown below:

COLUMN 3

Line 20, "using," should read --using--.

Signed and Sealed this

Nineteenth Day of March, 1996

*Attest:*

BRUCE LEHMAN

*Attesting Officer*   *Commissioner of Patents and Trademarks*